US006924609B2

(12) United States Patent
Bürger et al.

(10) Patent No.: US 6,924,609 B2
(45) Date of Patent: Aug. 2, 2005

(54) CONTROL DEVICE/MECHANISM FOR A MOTOR FOR ADJUSTING A CONTROL UNIT

(75) Inventors: Frank Bürger, Düren (DE); Norbert Ludwig, Brüggen (DE)

(73) Assignee: Pierburg GmbH, Neuss (DE)

( * ) Notice: Subject to any disclaimer, the term of this patent is extended or adjusted under 35 U.S.C. 154(b) by 188 days.

(21) Appl. No.: 10/355,012

(22) Filed: Jan. 31, 2003

(65) Prior Publication Data

US 2003/0146721 A1 Aug. 7, 2003

(30) Foreign Application Priority Data

Feb. 1, 2002 (DE) ........................................ 102 04 199

(51) Int. Cl.[7] .................................................. H02P 1/04

(52) U.S. Cl. ....................... 318/254; 318/439; 123/399; 137/554

(58) Field of Search ................................ 318/280, 254, 318/439, 721; 324/207.2, 207.25; 123/399, 559, 564; 137/554; 73/1.75, 118.1; 251/129.11; 310/156, 268, 68 B

(56) References Cited

U.S. PATENT DOCUMENTS 4,596,225 A * 6/1986 Oonaka et al. .......... 123/559.3
4,611,568 A * 9/1986 Onaka et al. ............ 123/559.3
4,642,496 A * 2/1987 Kerviel et al. ............ 310/68 B
4,656,992 A * 4/1987 Oonaka et al. .......... 123/559.3
4,706,005 A * 11/1987 Iwako ........................ 318/603
5,004,081 A * 4/1991 Custer ....................... 180/68.5
5,431,141 A * 7/1995 Kanazawa et al. .......... 123/399
5,609,184 A * 3/1997 Apel et al. .................. 137/554
5,823,165 A * 10/1998 Sato et al. .................. 123/399
6,205,866 B1 * 3/2001 Ullmann et al. ....... 73/862.333
6,212,783 B1 * 4/2001 Ott et al. ..................... 33/1 PT
6,283,150 B2 * 9/2001 Apel et al. .................. 137/554
6,400,141 B1 * 6/2002 Apel et al. ............... 324/207.2
6,559,637 B2 * 5/2003 Miyata et al. ........... 324/207.2
2001/0002599 A1 * 6/2001 Apel et al. .................. 137/554
2002/0089324 A1 * 7/2002 Miyata et al. ........... 324/207.2
2002/0166362 A1 * 11/2002 Kubota et al. ............... 73/1.75
2003/0210004 A1 * 11/2003 Zacher et al. ............... 318/254
2003/0221670 A1 * 12/2003 Wayama ..................... 123/399
2003/0227271 A1 * 12/2003 Shindo ....................... 318/439
2004/0051490 A1 * 3/2004 Abe et al. ................... 318/439
2004/0085041 A1 * 5/2004 Prudham .................... 318/721
2004/0085062 A1 * 5/2004 Miyata et al. ........... 324/207.2

FOREIGN PATENT DOCUMENTS

DE 101 23 605 A1 6/2002
DE 101 00 966 A1 7/2002
JP 09287485 A * 11/1997 ............ F02D/9/02

* cited by examiner

*Primary Examiner*—Paul Ip
(74) *Attorney, Agent, or Firm*—Griffin & Szipl, P.C.

(57) ABSTRACT

The invention relates to a control device for a motor for adjusting a control unit. A motor (5) that serves for adjusting a control unit (20) is shut off in a known control device with at least one Hall switch, when the control unit (20) has achieved a desired position. In the aforementioned variant, it is proposed that the running direction of the motor (5) is determined by a signal ($U_H$) obtained from such a Hall switch, and, if necessary, the motor (5) is prepared for reversal.

13 Claims, 1 Drawing Sheet

CONTROL DEVICE/MECHANISM FOR A MOTOR FOR ADJUSTING A CONTROL UNIT

FIELD OF THE INVENTION

The invention relates to a control device for a motor for adjusting a control unit.

Control units are used, in particular, in vehicles, such as motor vehicles, airplanes, ships, etc., in order to be able to adjust flaps, throttle valves, etc.

BACKGROUND OF THE INVENTION

A control device for such a control unit is described in published DE 10100966.6. The control unit comprises a diametrical magnet and at least one Hall switch. The magnet is connected with at least one control unit and segmented either diametrically or in a multi-polar fashion. By means of this magnet, with adjustment of the control unit and thereby a change in its position with respect to the Hall switch, a shut-off signal is created over the Hall switch for the motor. It is assumed that the segmentation is a measurement of the angular position, particularly the end position of the control unit.

In unpublished DE 10123605.0, a round magnet is disclosed, which is constructed as a thin walled ring magnet, or, as the case may be, a partial ring magnet. This magnet has a linear field layout.

An object of the present invention lies in developing a further effective control device for a motor for adjusting a control unit.

It is a further object of the invention to provide a control device for a motor for controlling a control unit that improves upon the control devices of the prior art.

SUMMARY OF THE INVENTION

The objects are solved by the characteristics of the invention as described below.

The invention is based on the idea of producing a signal upon reaching an adjusted position of the adjustable control unit, with which signal the subsequent, that is, the next operating direction of the motor is preset, wherein this position does not necessarily need to change. This can, for example, relate to a signal produced to turn off the motor, which is prepared by a Hall switch that works together with a magnet on the control unit. This signal is then compared in a logic circuit with a second adjustment signal, which is, according to definition (software) for changing direction of the motor either the same as or different from the Hall switch signal. By means of this evaluation, the motor is then so controlled that it either remains or changes in a right or left rotation. The logic circuit works with two differing signal levels for the running directions, a low (0) and a high (1) signal.

For activating the Hall switch, a segmented diametrical magnet is provided on the control unit, whereby the pole reversal between N (north) and S (south) produces a signal at the Hall switch.

A further variant is arrived at by using a ring magnet, or, as the case may be, partial ring magnet according to DE 10123605.0. The Hall switch therefore no longer reacts to pole reversals, but, works by arriving at a predetermined voltage value, which is preferably programmable in the Hall switch and can be clearly coordinated by means of the linear field layout, whereby in further versions of the invention a programmable Hall sensor is employed. In this way, a individual angle sizes as well as differing end positions can be freely programmable.

With a control device of this kind, one can control, among other things, single controls whose most important positions are 0° and 90° that adjust sealing flaps, as well as flaps with differing angular positions or end positions smaller than 90°.

The solution according to the present invention allows a non-locking, non-contact flap control with right/left operation and a freely programmable angle (end point) adjustment.

In accordance with the above objects, in one embodiment, the present invention provides a control device for a motor (5) for adjusting a control unit (20), wherein the motor (5) and the control unit (20) are functionally connected, wherein a magnet (1, 10, 11) is disposed on a shaft of the control unit (20), which is associated with at least one Hall switch (2) that creates at least one signal ($U_H$) by displacement of the magnet (1, 10, 11). In this embodiment, the signal ($U_H$) serves for the presetting of a running direction of the motor (5), wherein this signal ($U_H$) is directed to a logic circuit (3), that is connected to a bridge end switch (4). The signal ($U_H$) is compared with a adjustment signal ($U_{ST}$) applied to another input (E1) of the logic circuit (3) and a corresponding control signal for the motor (5) is output from the output of the bridge end switch (4).

In accordance with another embodiment, the invention provides a control device for a motor for adjusting a control unit having a shaft, wherein the motor and the control unit are functionally connected. The embodiment provides (a) a magnet disposed on the shaft of the control unit. The embodiment further provides (b) at least one Hall switch disposed to create at least one first signal ($U_H$) upon displacement of the magnet, wherein the first signal ($U_H$) presets a running direction of the motor. In addition, there is provided (c) a logic circuit having an output, and having first and second inputs, and disposed to receive an adjustment signal in the first input and the first signal ($U_H$) in the second input. Further provided is (d) a bridge end switch operably connected to receive the output of the logic circuit and having an output operably connected to the motor. In addition, (e) the bridge end switch is so connected with the logic circuit and the motor that when the first signal ($U_H$) is compared with the adjustment signal ($U_{ST}$) in the logic circuit, a corresponding control signal for the motor is output from the output of the bridge end switch.

According to a further embodiment, the at least one Hall switch is programmable, and comprises a memory having stored therein differing angular positions of the control unit.

In accordance with a still further embodiment, end position angles of the control unit are freely selectable and programmable in the programmable Hall switch.

In accordance with yet another embodiment, the magnet is a segmented magnet unit.

In another embodiment, the magnet is a diametrical magnet.

In a still further embodiment, the first signal ($U_H$) is created upon detection of a pole reversal between north (N) and south (S).

In another embodiment the magnetic is a ring or partial ring magnet. In this last embodiment, the first signal ($U_H$) is preferably produced upon achievement of a pre-programmed voltage value corresponding to a field layout of the ring magnet or partial ring magnet.

The present invention will be more closely described by means of the exemplary embodiments along with the drawings. One of ordinary skill in the art will be able to take the characteristics of these embodiments, and, in accordance with the objects use them singly or combine them in a sensible manner.

Further objects, features and advantages of the invention will become apparent from the Detailed Description of Preferred Embodiments, which follows, when considered together with the attached Figures.

DETAILED DESCRIPTION OF THE PREFERRED EMBODIMENTS

Figure 1:
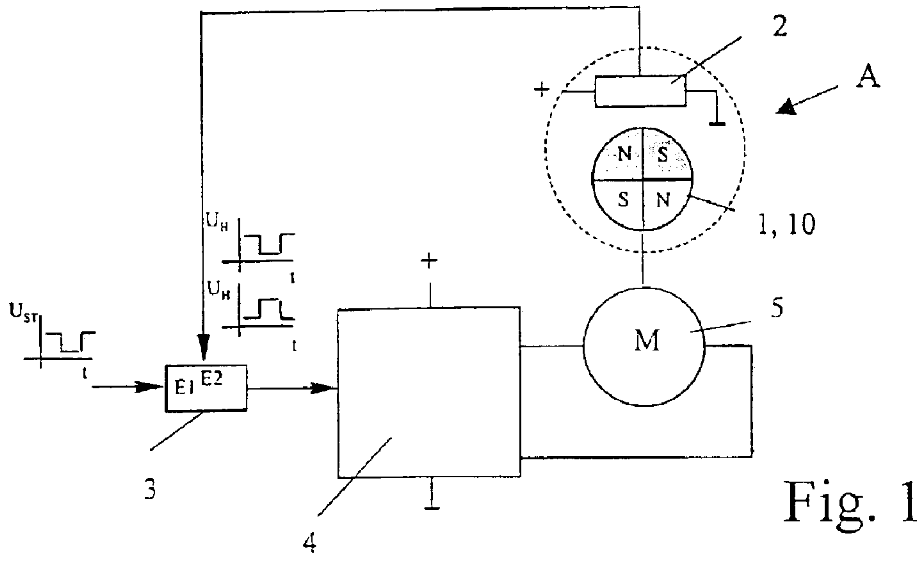
FIG. 1 shows a control device shown in simplified circuit diagram with a four-pole segment magnet and a Hall switch.

The invention will now be described in greater detail with respect to certain illustrative embodiments with reference to the Figures, in which like parts are indicated by like reference numerals.

FIG. 1 shows a control device for a control unit 20, not shown in greater detail, in a circuit arrangement. A magnet is signified by numeral 1, in this case a segmented round magnet 10, that is coordinated with a Hall switch 2. The round magnet 10 is, in this case, tetra polar and symmetric, whereby the varying pole transitions N/S, or, as the case may be S/N, define various switching points on the Hall switch 2. The Hall switch 2 is preferably programmable. An output of the Hall switch 2 leads to an input E2 of the logic circuit 3 whose other input E1 is impacted with signals from a separate control apparatus (not shown in greater detail). The logic circuit 3 leads, on the output side to a simply shown bridge end switch 4 from which the motor 5 receives its drive signal.

The logic circuit 3 functions as a connecting member, that is, as a comparator between the signals of the separate control devices and the signals of the Hall switch 2, as an evaluating device for the switches of the motor 5.

By application of an adjustment signal $U_{ST}$ from the control device logic circuit 3, this switches through wherein at this time point no defined signal $U_H$ is dispatched from the Hall switch 2. The motor 5 is initiated by switching through, wherein the motor 5 adjusts the position of the segment magnet 10 to the Hall switch with the round magnet 10 connected to the control unit 20. In this manner, the pole orientation changes from, for example, N/S to S/N, with respect to the Hall switch 2. This results in the Hall switch 2 switching during the pole reversal and a corresponding signal $U_H$ is sent to the logic circuit 3, whereby the motor is turned off.

At the same time, by means of a comparison between signal $U_H$ and adjustment signal $U_{ST}$ in the logic circuit, it can be determined which operating direction is to be input, so that a new operating direction right/left for motor 5 can be predetermined. The logic circuit 3 compares the signal level of both signals $U_H$ and $U_{ST}$ which, according to the software, was to either have the same or differing levels for a switching reversal. The motor 5 is, by means of this switching reversal, either set at ready or maintains its old running direction, which is determined by a corresponding output signal of the bridge end switch 6.

With application of a new reversed adjustment signal $U_{ST}$ from the control device, the motor 5 is moved in a new running direction. In this manner, the entire process is repeated, wherein the Hall switch 2 switches anew and sends a new signal $U_H$ to the logic circuit 3, which shuts off motor 5 and prepares the same for its running direction.

Particularly with a new start, the determination of the switching state of Hall switch 2 is advantageously left out along with a determination of the actual position of the control unit 20 and motor 5.

Figure 1A:
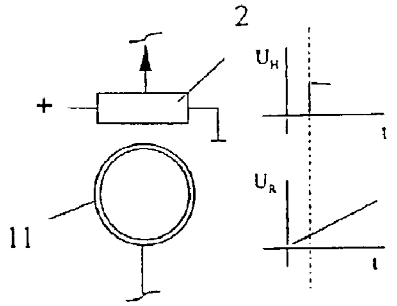
FIG. 1*a* shows the cut-out A in FIG. 1 with a thin walled ring magnet.

In a particular variant, as shown in FIG. 1*a,* one can utilize a thin-walled diametrical ring magnet 11 instead of the segment magnet 10, wherein the field layout of the ring magnet 11 is also linear. The Hall switch 2 utilized in this example is also programmable, but does not react to a pole reversal, rather it reacts to the achievement of a predetermined voltage value $U_R$, that is programmed into the Hall switch 2. Because of the linearity of the field layout, a particular voltage value $U_R$ is assigned during the programming of this value.

With a control unit 20, for example, a throttle valve, that conventionally has two states, either "fully open" or "fully closed", the reversal to another running direction is achieved when the flap achieves its end state at 0° or 90°.

In the case of a control unit 20 in which smaller angular positions are stepwise adjustable, this is preferably programmed into the Hall switch 2. A running direction switch reversal is thereby achieved according to programming. For this control unit 20, one preferably uses a diametrical ring magnet 11, wherein a finely segmented magnet 10 may also be used. In this preferred embodiment, the control unit 20 is provided with end points smaller than 90°, because these end points can also be programmed into the Hall switch 2.

Figure 2:
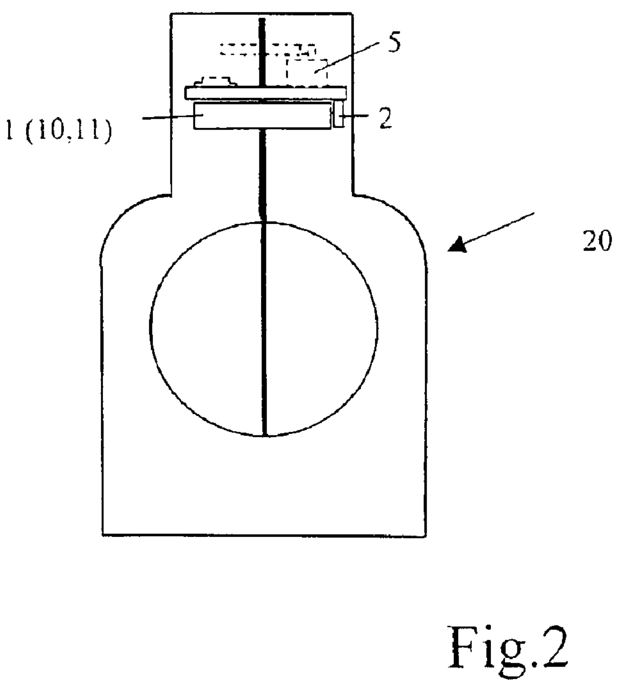
FIG. 2 shows a control unit according to the state of the art.

For completeness, a control unit 20 according to the state of the art is shown in FIG. 2, which is functionally connected with magnets 1 (10, 11).

It is apparent that changes are possible within the scope of the inventive idea.

Thus, a bar magnet (not shown) can also be used which has a sector-shaped circumference or has a sector-shaped surface, wherein the rotating movement of the control unit is converted to a linear movement of the magnet 1 with respect to the hall switch 2, which is reflected in a two and fro movement of magnets 1.

For other angular settings, for example 0° and 180°, a simple diametrical magnet can also be used as magnet 1 (not shown in detail).

While the present invention has been described with reference to certain illustrative embodiments, one of ordinary skill in the art will recognize, that additions, deletions, substitutions and improvements can be made while remaining within the scope and spirit of the invention as defined by the appended claims.

What is claimed is:

1. A control device for a motor for adjusting a control unit having a shaft, wherein the motor and the control unit are functionally connected, comprising:

(a) a magnet disposed on the shaft of the control unit;

(b) at least one Hall switch disposed to create at least one first signal ($U_H$) upon displacement of the magnet, wherein the first signal ($U_H$) presets a running direction of the motor;

(c) a logic circuit having an output, and having first and second inputs, and disposed to receive an adjustment signal ($U_{ST}$) in the first input and the first signal ($U_H$) in the second input;

(d) a bridge end switch operably connected to receive the output of the logic circuit and having an output operably connected to the motor; and (e) wherein the bridge end switch is so connected with the logic circuit and the motor that when the first signal ($U_H$) is compared with the adjustment signal ($U_{ST}$) in the logic circuit, a corresponding control signal for the motor is output from the output of the bridge end switch.

2. A control device according to claim 1, wherein the at least one Hall switch is programmable, and comprises a memory having stored therein differing angular positions of the control unit.

3. A control device according to claim 2, wherein end position angles of the control unit are freely selectable and programmable in the programmable Hall switch.

4. A control device according to claim 3, wherein the magnet is a segmented magnet unit.

5. A control device according to claim 4, wherein the magnet is a diametrical magnet.

6. A control device according to claim 2, wherein the magnet is a segmented magnet unit.

7. A control device according to claim 6, wherein the magnet is a diametrical magnet.

8. A control device according to claim 1, wherein the magnet is a segmented magnet unit.

9. A control device according to claim 8, wherein the magnet is a diametrical magnet.

10. A control device according to claim 1, wherein the magnetic is a ring or partial ring magnet.

11. A control device according to claim 10, wherein the first signal ($U_H$) is produced upon achievement of a preprogrammed voltage value corresponding to a field layout of the ring magnet or partial ring magnet.

12. A control device for a motor for adjusting a control unit having a shaft, wherein the motor and the control unit are functionally connected, comprising:

(a) a magnet disposed on the shaft of the control unit, wherein the magnet is a segmented magnet unit;

(b) at least one Hall switch disposed to create at least one first signal ($U_H$) upon displacement of the magnet, wherein the first signal ($U_H$) presets a running direction of the motor;

(c) a logic circuit having an output, and having first and second inputs, and disposed to receive an adjustment signal ($U_{ST}$) in the first input and the first signal ($U_H$) in the second input;

(d) a bridge end switch operably connected to receive the output of the logic circuit and having an output operably connected to the motor; and (e) wherein the bridge end switch is so connected with the logic circuit and the motor that when the first signal ($U_H$) is compared with the adjustment signal ($U_{ST}$) in the logic circuit, a corresponding control signal for the motor is output from the output of the bridge end switch, and wherein the first signal ($U_H$) is created upon detection of a pole reversal between north (N) and south (S).

13. A control device for a motor for adjusting a control unit having a shaft, wherein the motor and the control unit are functionally connected, comprising:

(a) a magnet disposed on the shaft of the control unit, wherein the magnet is a segmented diametrical magnet;

(b) at least one Hall switch disposed to create at least one first signal ($U_H$) upon displacement of the magnet, wherein the first signal ($U_H$) presets a running direction of the motor;

(c) a logic circuit having an output, and having first and second inputs, and disposed to receive an adjustment signal ($U_{ST}$) in the first input and the first signal ($U_H$) in the second input;

(d) a bridge end switch operably connected to receive the output of the logic circuit and having an output operably connected to the motor; and (e) wherein the bridge end switch is so connected with the logic circuit and the motor that when the first signal ($U_H$) is compared with the adjustment signal ($U_H$) in the logic circuit, a corresponding control signal for the motor is output from the output of the bridge end switch, and wherein the first signal ($U_H$) is created upon detection of a pole reversal between north (N) and south (S).

* * * * *